July 31, 1923.
O. L. LEWIS
1,463,327
POWER TRANSMISSION CLUTCH
Filed Feb. 8, 1922
2 Sheets-Sheet 2
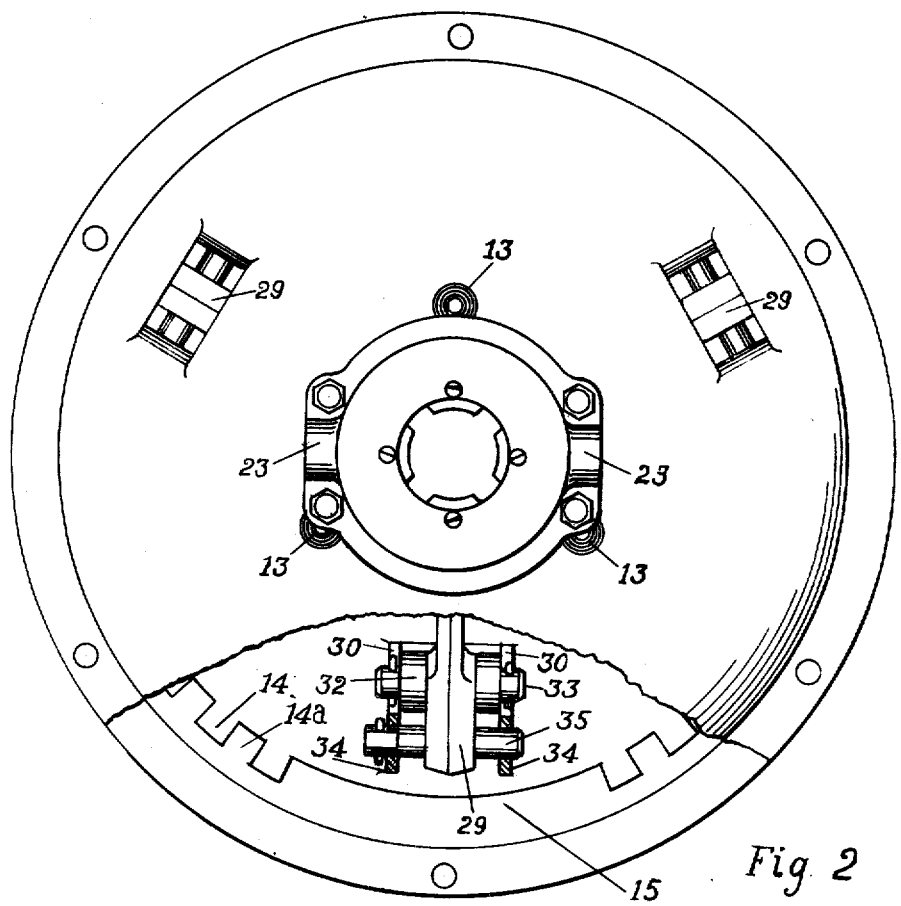
Fig. 2
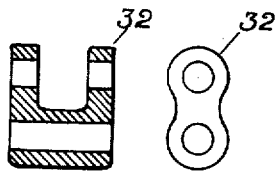
Fig. 3   Fig. 4
 
Fig. 5   Fig. 6
Otto Leroy Lewis INVENTOR.

Patented July 31, 1923.

1,463,327

UNITED STATES PATENT OFFICE.

OTTO LEROY LEWIS, OF CHICAGO, ILLINOIS.

POWER-TRANSMISSION CLUTCH.

Application filed February 8, 1922. Serial No. 534,998.

*To all whom it may concern:*

Be it known that I, OTTO LEROY LEWIS, a citizen of the United States, residing at Chicago, in the county of Cook and State of Illinois, have invented a new and useful Improvement in a Power-Transmission Clutch, of which the following is a specification.

My invention relates generally to friction clutches used to transmit power from a driving member to a driven member, and more particularly to clutches installed in connection with engine flywheels on motor vehicles and farm tractors for the purpose of controlling the power delivered from the engines to the transmission drive shafts.

The primary object of this invention is the provision of a simple, practical, durable, and easily operated power transmission clutch having smooth engaging and steady driving qualities and not requiring frequent adjustment to take up wear. A further object is the provision of an easily assembled and durable clutch release mechanism, the thrust bearing of which may be well lubricated and protected from dirt. A still further object is the provision of a clutch mechanism which lends itself to cheap manufacture while retaining superior quality.

I attain these objects by the mechanism illustrated in the accompanying drawings, in which—

Figure 2 is an end view of the clutch removed from the flywheel, the view being from the transmission end, the transmission drive shaft not shown; this view being partly in section to disclose the arrangement of some of the working parts:

Figure 3 is a sectional view and Figure 4 is an end view of the fulcrum link between the throwout lever and one of the driven plates; Figure 5 is a section of the hinge-pin lugs, Figure 6 being an end view of the same.

Similar numerals refer to similar parts throughout the several views.

Figure 1:
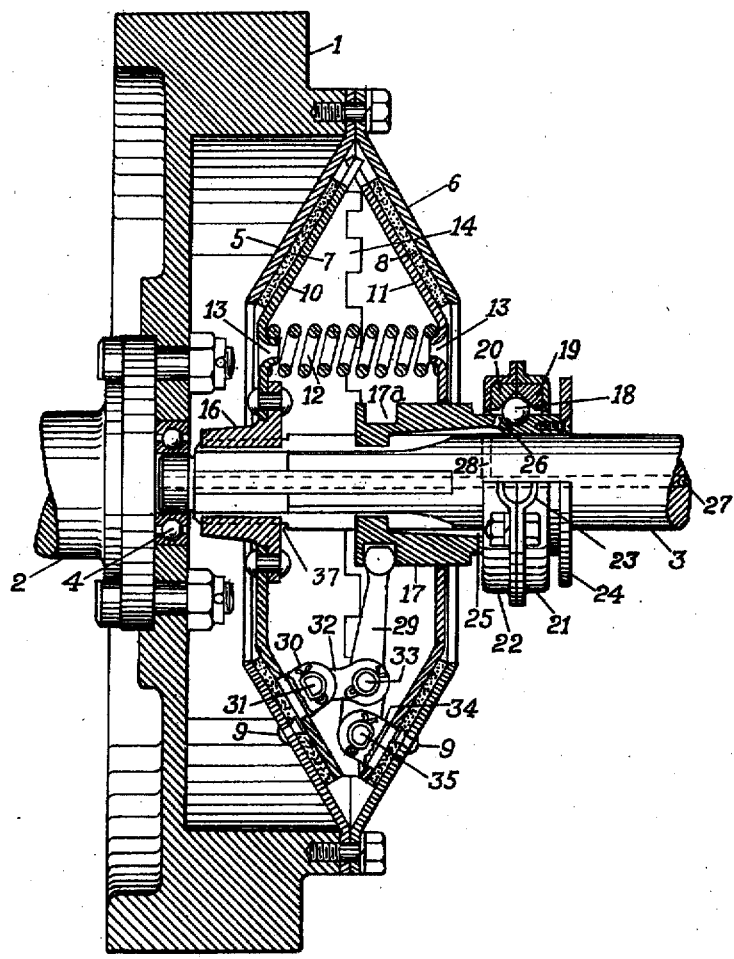
Figure 1 is a vertical section of the assembled clutch and engine flywheel, the adjacent ends of the engine crankshaft and transmission drive shaft being shown.

Referring now to these figures, and particularly to Figure 1, the engine flywheel 1 is bolted to the flange of engine crankshaft 2. The transmission drive shaft 3 has one end supported by bearing 4 mounted in flywheel 1. Securely fastened to the flywheel are the dished circular plates 5 and 6, forming the inside and outside clutch driving plates respectively. The inner surfaces of these plates are lined with friction facings 7 and 8 secured to their respective plates by a number of rivets, 9. The inside clutch driven plate 10 and the outside clutch driven plate 11 are so arranged that, when the clutch is engaged, pressure from a number of springs 12 enclosed between plates 10 and 11 holds these plates firmly against friction facings 7 and 8. Spring retaining bosses 13 maintain springs 12 in position. The springs are arranged so as to balance the pressure between the plates. The driven plates are interlocked at their outer edges by a series of processes and recesses 14 and 14ª, forming a dovetailed joint with a sliding fit. The processes are cut away at 15 near the throwout lever supports to facilitate assembly. The recesses are deep enough and the processes long enough so that plates 10 and 11 may move toward each other or away from each other for some distance before interfering or disengaging. Inside driven plate 10 has a centrally located hub 16 firmly fastened to it, the hub being splined to act as a driver for shaft 3; a portion of this shaft being splined a sliding fit for hub 16 and release sleeve 17. The diameter of shaft 3 is increased at 37 to form a stop for hub 16 and limit the travel of the hub along the spline. The outer end of release sleeve 17 is grooved to form the inner race for a ball thrust bearing 18. The outer race for this bearing is formed by two similar annular parts 19 and 20 securely held between parts 21 and 22, which not only retain the outer race parts but also act as a grease retainer and dirt excluder. Furthermore, parts 21 and 22 are provided with trunnion hole lugs 23 to receive the trunnions of a throwout yoke for releasing the clutch, this yoke not being shown. At the extreme outer end of release sleeve 17 is firmly fastened clutch brake disc 24. The bore of sleeve 17 is splined for a short distance from the inner end on shaft 3; the bore at the other end of the sleeve is a sliding fit on the unsplined portion of shaft 3; and the central portion of the bore forms a tapered recess with the largest diameter of the taper near the inner ball race. An oil hole 26 connects the tapered recess with the interior of the ball thrust bearing. The oil for lubricating the thrust bearing is supplied from the transmission through holes 27 and 28 in shaft 3, hole 28 leading to the tapered recess in collar 17. The tapered feature of the recess causes any oil that enters the recess to collect at the end having oil hole 26, due to centrifugal force when the engine is running, or gravity when it is not running.

One end of clutch throwout levers 29 is formed to fit and work in groove 17ª around release sleeve 17. Levers 29 are connected to lugs 30 on plate 10 by hinge pins 31, links 32, and hinge pins 33. Levers 29 are connected to lugs 34 on plate 11 by hinge pins 35. Hinge pins 31 and 35 are flatted at one end to prevent rotation, a corresponding flat being made in one of the pin holes in each set of lugs on each plate.

The action of the clutch is as follows: When engaged, springs 12 hold plates 10 and 11 firmly against friction facings 7 and 8 on plates 5 and 6. Motion is therefore transmitted from the flywheel through plates 5 and 6 by friction to interlocked plates 10 and 11 which drive shaft 3 through splined hub 16. The clutch may be released by moving the thrust bearing away from the clutch, the motion being transmitted to release sleeve 17 and thence through release levers 29 to plates 10 and 11. The initial movement of levers 29 pulls plate 10 away from friction facing 7 and against stop 37 on shaft 3. A further movement pulls plate 11 away from friction facing 8, thereby completely releasing the clutch. A motion of the thrust bearing toward the clutch reverses the above operations and provides a gradual engagement which is very desirable. It will be noted that, due to the arrangement of the release levers, less pressure is required to release the clutch than is exerted by the clutch springs. Also that the holding power of the clutch plates may be increased by increasing the angle included between the clutch plates, it being practical to make this angle anything desired from zero to about 170 degrees. It will also be seen that on new installations plate 5 may be dispensed with and the flywheel machined to form a seat for friction facing 7; also that the engaging surfaces of the clutch may be curved as well as plain. I fully realize these and other variations which may be made without departing from the spirit of this invention, and therefore I do not limit myself to the specific form shown and described.

I claim:

1. A power transmission clutch of the character described, including a driving member, a pair of dished plates attached to the driving member, friction linings attached to the inner surfaces of these plates, a pair of dished interlocking plates included between the friction linings and capable of making frictional driving contact with the same, springs for forcing the interlocking plates outwardly against the friction linings, a driven shaft, a hub concentric with the interlocking or driven plates and acting as a driver between the driven plates and the driven shaft, means for limiting the travel of the hub along the shaft, levers attached by hinge pins to one of the interlocking plates and by hinge pins through swinging links to the other interlocking plate, and means for operating said levers in a manner to permit or release the spring pressure between the interlocking plates.

2. A power transmission clutch of the character described, including a driving member, driving plates mounted on the driving member, a driven member, interlocking plates installed between friction elements mounted on the driving plates, springs included between the interlocking plates for forcing outwardly the interlocking plates against the friction elements, a hub concentric with the interlocking plates and acting as a driver between the interlocking plates and the driven member, means for limiting the travel of the hub along the driven member, links, levers and hinge pins for controlling the pressure of the interlocking plates against the friction elements, a sleeve concentric and rotating with the driven member, mounted thereon in a sliding relation and having means for operating the pressure controlling levers, a ball thrust bearing mounted on said sleeve, means for retaining the several parts of the ball thrust bearing in proper relation to each other means for supplying lubricant to the ball thrust bearing and retaining the same, and means for transmitting external pressure to the bearing housing for the purpose of releasing the clutch.

OTTO LEROY LEWIS.